April 12, 1960 W. HAUSER-BUCHER 2,932,354
ROOT CROP-HARVESTING MACHINE HAVING A
SWINGING PLOW AND GRATE MEANS
Filed Nov. 26, 1957
Fig. 1
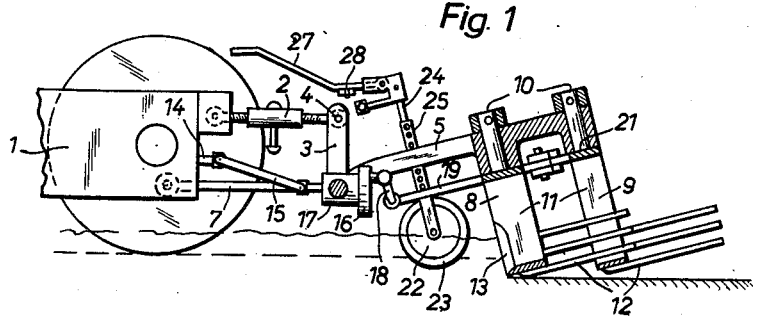
Fig. 2
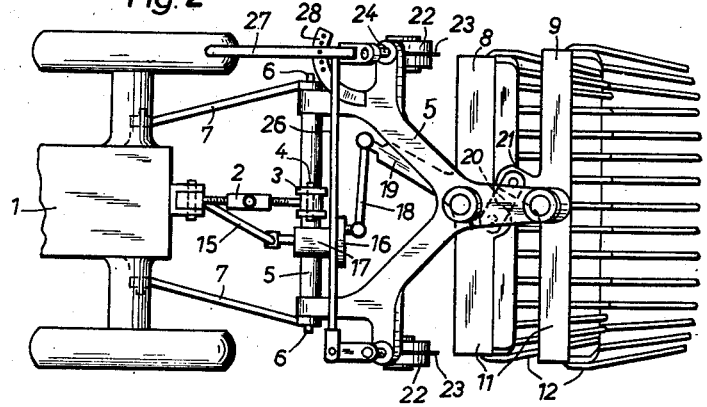
Fig. 3
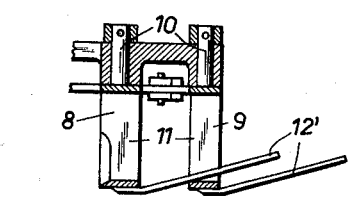
Fig. 4
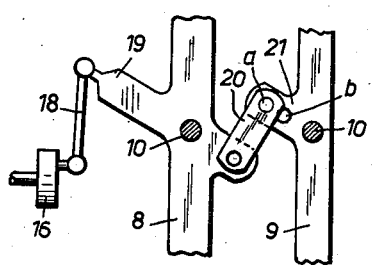
Fig. 6
Fig. 5
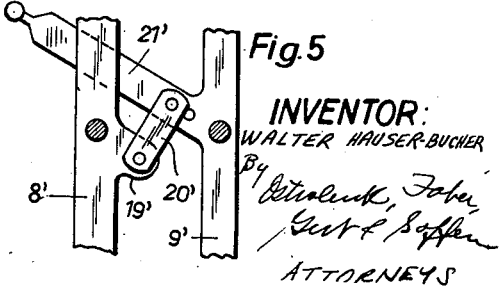
INVENTOR:
WALTER HAUSER-BUCHER
By
ATTORNEYS

United States Patent Office 2,932,354
Patented Apr. 12, 1960

2,932,354

ROOT CROP-HARVESTING MACHINE HAVING A SWINGING PLOW AND GRATE MEANS

Walter Hauser-Bucher, Niederweningen, Zurich, Switzerland, assignor to Bucher-Guyer A.-G. Maschinenfabrik, Zurich, Switzerland Application November 26, 1957, Serial No. 698,998

Claims priority, application Switzerland November 27, 1956

4 Claims. (Cl. 171—132)

The present invention relates to a root crop-harvesting machine comprising a plow-share and at least two swing grates, as it is used particularly for harvesting potatoes.

Machines of the above kind are known which are formed as swing grate diggers and in which the crop to be uprooted is dug out by a plow-share and by the latter delivered to the adjacent screen or grate conveyer. Machines of this type are also used, by means of which for instance two rows of potatoes may be dug out both at the same time. Two bar grates provided with plow-shares are arranged side by side and operate independently of each other, each tilling one potato mound. These machines still exhibit some imperfections with respect to their operating technique. Particularly in harvesting potatoes having an abundant growth of stalks, it has been found that the potato-tops clog up the space between the grate bars situated side by side and thus give cause to trouble. Moreover, it is desirable to have the area of the grate and thus the screening effect increased when soil has to be tilled which is difficult to screen.

It is an object of the invention to provide a machine of the type described enabling a thorough screening of the soil while simultaneously taking utmost care of the crop. The root crop-harvesting machine according to the invention comprises swing grates which carry grate bars situated in the direction of travel and are arranged partly overlapping in series with respect to the direction of travel, and a drive for said swing grates operating so that successive swing grates move oppositely to and fro approximately transversely to the direction of travel.

The present invention will now be described in more detail with reference to the accompanying drawings illustrating, by way of example, several embodiments of the invention, and in which:

Figure 1 is a view in elevation, partly drawn in section, of a root crop-harvesting machine coupled to a tractor;

Figure 2 is a plan view of the same machine;

Figure 3 shows diagrammatically a transverse view of the frame of a swing grate;

Figure 4 represents an enlarged view of the driving elements of the machine;

Figure 5 is a modification of the driving elements shown in Figure 4, and

Figure 6 is a modification of the construction of the swing grates.

The root crop-harvesting machine shown is coupled to the tractor 1 by means of a three point suspension. The longitudinally adjustable top link 2 of the three point suspension is pivotally connected to the chassis frame 5 of the machine by means of a supporting arm 3 and a hinge pin 4. The machine is also hingedly connected to the lower links 7 of the suspension on the journal bolts 6. Two swing grates 8 and 9 are pivotally mounted on the chassis frame 5 by means of the bearing pins 10. Each of the two swing grates 8, 9 consists of a frame 11 and of grate bars 12 secured to the frame 11 and extending at right angles to the latter. The frame 11 of the leading swing grate 8 is formed as plow-share 13 on the side facing the tractor. The drive of the two swing grates 8, 9 is effected from the power take-off shaft end 14 of the tractor 1. The shaft 14 drives by means of a universal joint shaft 15 the crank disk 16 which is pivotally mounted in the bearing 17. The bearing 17 is rigidly secured to the chassis frame 5. The rotating movement of the crank disk 16 is transmitted by means of a connecting rod 18 to a two-armed rocking lever 19 adapted to oscillate in a horizontal plane. The rocking lever 19 is rigidly connected with the forward swing grate 8 which is pivotally mounted in the chassis frame 5 by the bearing pin 10. The movement of the two-armed rocking lever 19 is transmitted by means of a link 20 to a one-armed rocking lever 21 which in turn causes the rear swing grate 9 to oscillate. The link 20 may engage the rocking lever 21 either in the opening $a$ or in the opening $b$ which are provided in said lever. By changing the lever transmission on the rocking lever 21, the ratio of the stroke lengths of the two swing grates or the angle of oscillation of the grate 9 with respect to grate 8 will be varied.

The harvesting machine is supported on the ground by two supporting rolls 22, which are adapted for depth adjustment and provided with a wheel flange 23 on their periphery. The supporting rolls 22 are pivotally mounted in the fixed bearing tube 25 by means of forks 24 which are longitudinally adjustable in the tubes. A tie rod 26 connects the two supporting rolls 22 for movement parallel to each other. The supporting rolls 22 can be angularly adjusted by the driver of the tractor by means of the adjustment lever 27 and fixed in the desired position by means of a segment 28.

The crop together with earth, stones and stalks, as dug out by the plow-share 13, is fed to the two partly overlapping swing gates 8, 9 situated one behind the other, upon which grates said crop together with stones and stalks, under gradual sieving away of the earth, is moved rearwardly opposite to the direction of travel of the tractor and deposited on the field, owing to the vibratory movements which are imparted to said swing grates in opposite direction and approximately at right angles to the direction of travel. The wheel flange 23 provided on the supporting rolls 22 forces the potato stalks against the ground during this operation and cuts them to pieces. Thereby a clean separation is achieved between the potato stalks of those rows which are just dug out and the stalks of the rows remaining untouched.

The main requirement of a machine of the type described consists in obtaining an utmost intensive sifting of the entrained earth, while simultaneously protecting the crop against damage. These objects are achieved in that the reciprocating movements of the swing grates 8 and 9 are directed substantially transversely to the direction of travel, that the swing grates 8, 9 partly overlap so as to oblige the dug out earth and potatoes to fall from the upper to the lower grate bars 12, that the screening area of the swing grates 8, 9 is of a size extending in width across two rows of potatoes, and that the overlapping swing grates 8, 9 swing in opposite directions. The counter-movement causes that the earth, which is dug out by the plow-share 13 and forms a solid mass, is torn apart and loosened up.

Naturally in reciprocating drives of the kind described, the masses must be balanced in order to reduce the vibrations of the machine to a tolerable degree. Owing to the particular construction of the reciprocating drive, the two swing grates 8, 9 positioned in series will effect reciprocation movements in opposite directions. The counter-movements of the described rocking action result in that the oscillating masses of the swing grates 8, 9 oppose each other and to a certain degree balance each other.

It is necessary that the operating position of the machine with respect to the soil to be tilled can be adjusted for the varying conditions of the ground. By changing the length of the top link 2 the machine is angularly moved about the pivot point of the journal bolts 6 for the lower links 7 of the three point suspension. The inclined position of the two swing grates 8, 9 and thus also the angle of attack of the plow-share 13 provided on the forward swing grate 8 will thereby be changed. The operating depth of the machine is set to the desired degree by adjusting the depth of the two supporting rolls 22.

When operating on a sloping field, the disadvantage appears when the tractor advances transversely to the slope, that the rut of the working tools drawn by a tractor is displaced in downhill direction with respect to the rut of the tractor. The adjustability of the direction of travel of the two supporting rolls 22 provides the possibility of controlling the direction of travel of the harvesting machine by adjusting the rolls 22 at an angle to the direction of travel. Thereby the machine has the tendency to move uphill and thus can be retained within the rut of the tractor.

In the modification according to Figure 5, in place of the rocker lever 19 of the forward swing grate 8, the rocker lever 21' of the rear swing grate 9' is extended so that it may be coupled with the connecting rod 18, the two rocker levers 19' and 21' being again connected with each other by a link 20'. This modification offers the advantage that the grates 8', 9' can be positioned with respect to the tractor further forwards than it would be possible in the form of construction shown in Figures 1 and 4.

Moreover, while in the form of construction indicated in Figure 1 the frames 11 of both swing grates 8, 9 must be positioned at a rather substantial incline, they may be arranged approximately in upright direction during operation in the modification according to Figure 6, since in this embodiment the grate bars 12' are secured to the frame 11 at an angle.

It would also be possible to construct the described apparatus so as to operate only in a single row of potatoes instead of in two rows. For this purpose the arrangement and the driving mechanism of the swing grates 8 and 9 would remain unchanged, but only the working width of the swing grates would be reduced by about one half.

I claim:
1. A root crop harvesting machine having a frame and comprising two swing grates disposed one behind the other in the direction of the travel of the machine, a plowshare on the forwardly situated swing grate, said swing grates including grate bars extending rearwardly from the direction of travel of the machine, the bars of the forward grate partly overlapping the bars of the rearward grate, a generally vertical respective bearing support means carried by said frame, for each of said swing grates, a driving mechanism connected to said swing grates and imparting oscillatory motion thereto about said respective bearing support means in a direction generally transverse to the direction of travel of the machine, and means oscillating the grates in opposition to each other.

2. A root crop harvesting machine as set forth in claim 1, wherein said grate bars are fixed at an angle to said swing grates, so that the bars extend in upwardly inclined position when the swing grates are generally vertically disposed.

3. A root crop harvesting machine as set forth in claim 1, said driving mechanism comprising a lever connected to one of said swing grates and operable to oscillate said grate, a link interconnecting said two swing grates and pivotally secured thereto, whereby rocking of said lever affects oscillatory motion of said one swing grate, which motion is transmitted through said link to said second swing grate, said link having an adjustable connection with one of said swing grates effective to vary the amplitude of oscillatory motion with respect to the other swing grate.

4. A root crop harvesting machine as set forth in claim 1, including roller means connected to said frame and adapted to lend support to said frame with respect to the ground, and means for adjusting said roller means with respect to said frame to raise or lower a portion of said frame with respect to the ground for varying the angle of attack of said plowshare, wherein the oscillatory axis of said grates is varied to a pre-determined degree from a true vertical position.

References Cited in the file of this patent

UNITED STATES PATENTS

| | | |
|---|---|---|
| 332,644 | Cummings | Dec. 15, 1885 |
| 509,760 | McDougall | Nov. 28, 1893 |
| 726,549 | Lilly | Apr. 28, 1903 |
| 1,345,964 | Scott | July 6, 1920 |

FOREIGN PATENTS

| | | |
|---|---|---|
| 671,834 | Great Britain | May 14, 1952 |